(12) United States Patent
Sugisaki et al.

(10) Patent No.: US 6,674,897 B1
(45) Date of Patent: *Jan. 6, 2004

(54) PICTURE DATA COMPRESSION DEVICE AND RED DATA DETECTION DEVICE

(75) Inventors: Kiminori Sugisaki, Kanagawa (JP); Jason Fischl, Tokyo (JP); Nobuaki Izumi, Chiba (JP); Naofumi Yanagihara, Tokyo (JP); Yuka Kiyama, Chiba (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,747

(22) Filed: Sep. 15, 1997

Related U.S. Application Data

(63) Continuation of application No. 08/302,430, filed on Sep. 8, 1994, now abandoned.

(30) Foreign Application Priority Data

| Sep. 8, 1993 | (JP) | ............................................. 5-223266 |
| Feb. 25, 1994 | (JP) | ............................................. 6-028117 |
| Jul. 14, 1994 | (JP) | ............................................. 6-161854 |

(51) Int. Cl.[7] .............................. G06K 9/00; G06K 9/36
(52) U.S. Cl. ................. 382/166; 375/240.03; 382/165; 382/239; 382/251
(58) Field of Search ............................... 382/165, 166, 382/239, 250, 270, 271, 251; 345/152; 358/539, 518; 348/395, 403, 404, 405, 408; 375/240.03

(56) References Cited

U.S. PATENT DOCUMENTS

| 3,660,823 A | * | 5/1972 | Recks .................... 340/146.2 |
| 4,340,940 A | * | 7/1982 | Williams, Jr. et al. ...... 364/745 |
| 4,816,901 A |   | 3/1989 | Music et al. |
| 5,130,786 A |   | 7/1992 | Murata et al. |
| 5,218,431 A | * | 6/1993 | Gleicher et al. ............. 345/152 |
| 5,294,974 A | * | 3/1994 | Naimpally et al. ......... 348/405 |
| 5,317,396 A | * | 5/1994 | Fujinami .................... 348/390 |
| 5,347,310 A | * | 9/1994 | Yamada et al. ............. 348/405 |
| 5,517,334 A | * | 5/1996 | Morag et al. ................ 358/518 |

FOREIGN PATENT DOCUMENTS

| EP | 0 479 510 | 4/1992 |
| EP | 0 580 101 | 1/1994 |
| EP | 0 580 101 A2 | 1/1994 | ........... H04N/11/04 |

OTHER PUBLICATIONS

Patent Abstracts of Japan vol. 17, No. 680 (E–1476) Dec. 14, 1993, JP–A–05 227 441 (Mitsubishi Electric Corp.) Sep. 3, 1993.

Hill et al., Switching Theory & Logical Design, Third ed., 1981, pp. 23, 31, and 244–245.*

* cited by examiner

Primary Examiner—Timothy M. Johnson
(74) Attorney, Agent, or Firm—Frommer Lawrence & Haug LLP; William S. Frommer

(57) ABSTRACT

A picture data compressing device has picture data divided by a blocking circuit 1 in to a plurality of blocks, each block consisting of a pre-set number of pixels and shuffled by a shuffling circuit 2. The blocked and shuffled data is transformed by a DCT circuit 3 into data in the frequency domain and re-quantized by a quantization circuit 4, thereby compressing the picture data. A red detector 6 determines whether a block from the shuffling circuit 2 is the red-based block. If the red detector 6 detects a red-based block, a controller 7 controls the quantization circuit 4 so that the quantization step of the quantization circuit 4 will become finer. Thus, the data of the red-based block susceptible to block distortion may be quantized with a finer quantization step for improving reproduction and alleviating block distortion.

9 Claims, 11 Drawing Sheets

| ACmax | 0~7 | 8~23 | 24~71 | 72~191 | 192~ |
|---|---|---|---|---|---|
| Y | 0 | 1 | 2 | 3 | 3 |
| Cr | 1 | 2 | 3 | 3 | 3 |
| Cb | 2 | 3 | 3 | 3 | 3 |

FIG.9

| ACmax | | 0~7 | 8~23 | 24~71 | 72~191 | 192~ |
|---|---|---|---|---|---|---|
| Y | | 0 | 1 | 2 | 3 | 3 |
| PR | RED BLOCK | 0 | 0 | 0 | 0 | 3 |
| | ELSE | 1 | 2 | 3 | 3 | 3 |
| PB | | 2 | 3 | 3 | 3 | 3 |

FIG.10

(8×8) DCT

|   | 0 | 1 | 2 | 3 | 4 | 5 | 6 | 7 | h |
|---|---|---|---|---|---|---|---|---|---|
| 0 | DC| 0 | 0 | 1 | 1 | 2 | 3 | 4 |   |
| 1 | 0 | 0 | 1 | 1 | 2 | 3 | 4 | 5 |   |
| 2 | 0 | 1 | 1 | 2 | 3 | 4 | 5 | 6 |   |
| 3 | 1 | 1 | 2 | 3 | 4 | 5 | 6 | 6 |   |
| 4 | 1 | 2 | 3 | 4 | 5 | 6 | 6 | 7 |   |
| 5 | 2 | 3 | 4 | 5 | 6 | 6 | 7 | 7 |   |
| 6 | 3 | 4 | 5 | 6 | 6 | 7 | 7 | 7 |   |
| 7 | 4 | 5 | 6 | 6 | 7 | 7 | 7 | 7 |   | v

FIG.11(A)

(2×4×8) DCT

|   | 0 | 1 | 2 | 3 | 4 | 5 | 6 | 7 | h |
|---|---|---|---|---|---|---|---|---|---|
| 0 | DC| 0 | 1 | 2 | 2 | 4 | 5 | 6 |   |
| 1 | 0 | 1 | 2 | 3 | 4 | 5 | 6 | 6 |   |
| 2 | 1 | 1 | 3 | 4 | 5 | 6 | 7 | 7 |   |
| 3 | 1 | 3 | 4 | 5 | 6 | 7 | 7 | 7 |   |

(SUM)

|   | 0 | 1 | 2 | 3 | 4 | 5 | 6 | 7 |
|---|---|---|---|---|---|---|---|---|
| 4 | 0 | 0 | 1 | 2 | 3 | 4 | 5 | 6 |
| 5 | 0 | 1 | 2 | 3 | 4 | 5 | 6 | 6 |
| 6 | 1 | 2 | 3 | 4 | 5 | 6 | 7 | 7 |
| 7 | 1 | 3 | 4 | 6 | 6 | 7 | 7 | 7 |

(DIFFERENCE)

| QUANTIZATION NUMBER QNO | CLASS No. | | | | AREA No. | | | | | | | |
|---|---|---|---|---|---|---|---|---|---|---|---|---|
| | 0 | 1 | 2 | 3 | 0 | 1 | 2 | 3 | 4 | 5 | 6 | 7 |
| | 15 | | | | 1 | 1 | 1 | 1 | 2 | 2 | 2 | 2 |
| | 14 | | | | 1 | 1 | 1 | 1 | 2 | 2 | 2 | 2 |
| | 13 | 15 | | 15 | 1 | 1 | 1 | 1 | 2 | 2 | 2 | 2 |
| | 12 | 14 | | 14 | 1 | 1 | 1 | 1 | 2 | 2 | 2 | 2 |
| | 11 | 13 | 15 | 13 | 1 | 1 | 1 | 1 | 2 | 2 | 2 | 2 |
| | 10 | 12 | 14 | 12 | 1 | 1 | 1 | 2 | 2 | 2 | 2 | 4 |
| | 9 | 11 | 13 | 11 | 1 | 1 | 2 | 2 | 2 | 2 | 4 | 4 |
| | 8 | 10 | 12 | 10 | 1 | 2 | 2 | 2 | 2 | 4 | 4 | 4 |
| | 7 | 9 | 11 | 9 | 2 | 2 | 2 | 2 | 4 | 4 | 4 | 4 |
| | 6 | 8 | 10 | 8 | 2 | 2 | 2 | 4 | 4 | 4 | 4 | 8 |
| | 5 | 7 | 9 | 7 | 2 | 2 | 4 | 4 | 4 | 4 | 8 | 8 |
| | 4 | 6 | 8 | 6 | 2 | 4 | 4 | 4 | 4 | 8 | 8 | 8 |
| | 3 | 5 | 7 | 5 | 4 | 4 | 4 | 4 | 8 | 8 | 8 | 16 |
| | 2 | 4 | 6 | 4 | 4 | 4 | 4 | 8 | 8 | 8 | 16 | 16 |
| | 1 | 3 | 5 | 3 | 4 | 4 | 8 | 8 | 8 | 16 | 16 | 32 |
| | 0 | 2 | 4 | 2 | 4 | 8 | 8 | 8 | 16 | 16 | 32 | 32 |
| | | 1 | 3 | 1 | 8 | 8 | 8 | 16 | 16 | 32 | 32 | 32 |
| | | 0 | 2 | 0 | 8 | 8 | 16 | 16 | 32 | 32 | 32 | 32 |
| | | | 1 | | 8 | 16 | 16 | 32 | 32 | 32 | 32 | 32 |
| | | | 0 | | 16 | 16 | 32 | 32 | 32 | 32 | 32 | 32 |

FIG.12

PICTURE DATA COMPRESSION DEVICE AND RED DATA DETECTION DEVICE

This application is a continuation of application Ser. No. 08/302,430, filed on Sep. 8, 1994 now abandoned.

BACKGROUND OF THE INVENTION

This invention relates to a picture data compressing device which may be advantageously employed in an equipment handling compressed picture data, such as a digital Video Tape Recorder (VTR), television telephone system, teleconference system or a transmitter for a television station, and a red data detection device employed in such picture data compressing apparatus.

There has been known a digital VTR for digital recording/reproduction of picture information data. The recording system of the digital VTR is arranged as shown for example in FIG. 13, in which audio signals are fed via an input terminal 50 to an A/D converter 51 and picture signals are fed via an input terminal 53 to an A/D converter 54.

The A/D converter 51 digitizes the audio signals to generate audio data which is supplied to an audio recording processing circuit 52 which then processes the audio data into a form suitable for recording and transmits the processed audio data to an error correction encoding circuit 61.

The A/D converter 54 digitizes the picture signals by, for example, frame-based sampling, to generate component data, that is luminance data (Y data) and two color difference data (R-Y data and B-Y data), and transmits the component data to a blocking circuit 56 within a compression encoding circuit 55.

The blocking circuit 56 divides each of the Y-data, R-Y data and the B-Y data into blocks each consisting of a matrix of 8 vertically arrayed pixels and 8 horizontally arrayed pixels (DCT blocks), these blocks being routed to a shuffling circuit 57.

The shuffling circuit 57 generates a single macro-block from 8 DCT blocks, namely 6 Y data blocks, 1 R-Y data block and 1 B-Y data block. These 8 blocks are located at the same location on a picture. The shuffling circuit 57 effects pre-set shuffling on the macro-block basis, generates a single unit from five macro-blocks and outputs data on the unit basis. The unit picture data is supplied to a discrete cosine transform (DCT) circuit 58.

The DCT circuit 58 transforms the picture data of each macro-block making up the unit with data on the time scale into that on the frequency scale, and routes the transform coefficients to a quantization circuit 59.

The quantization circuit 59 selects such quantization coefficients which will give a fixed data length of the unit picture data outputted from a variable length encoding circuit 60 as later explained, and re-quantizes the unit-based picture data with the aid of these quantization coefficients. The unit-based picture data thus re-quantized is supplied to the variable length encoding circuit 60.

The variable length encoding circuit 60 processes the unit-based data into fixed-length data so that the data quantity of the picture data is not more than a pre-set quantity, and routes the resulting fixed-length data to the error correction coding combining circuit 61.

The error correction coding combining circuit 61 combines the unit-based picture data having the fixed length with the audio data supplied from the audio data recording processing circuit 52 to generate recording data. In addition, the error correction encoding combining circuit 61 appends so-called parity data for error correction to the recording data and routes the resulting signals to a recording modulation circuit 62.

The recording modulation circuit 62 modulates the recording data from the combining operation in a pre-set manner and routes the resulting modulated signals to a recording head 63. The recording head 63 records the picture data obliquely on a video tape, not shown.

By digitally recording the picture data (and audio data) in this manner, recording/reproduction may be achieved without deteriorating the picture quality by preventing adverse effects of the random noise or the like.

However, the above-mentioned digital VTR has a drawback that, since the picture data are divided into plural macro-blocks and processed with DCT or re-quantization or the like on the macro-block basis, there arises the risk of occurrence of so-called block distortion, in which the noise is produced at a junction between macro-blocks on the reproduced picture. Above all, the block distortion of a macro-block containing a large quantity of red-hued picture data, tends to be visually outstanding, and thus has been desired to be improved.

SUMMARY OF THE INVENTION

In view of the above-described problem of the prior art, it is an object of the present invention to provide a picture data compressing apparatus in which the block distortion containing a large quantity of the red-hued picture data is diminished to contribute to improvement in the picture quality.

It is another object of the present invention to provide a red data detection device in which the number of bits required in determining whether or not the picture data is red-hued may be reduced for simplifying the hardware.

The present invention provides a picture compressing device including blocking means for dividing picture data into plural blocks each consisting of a pre-set number of blocks and outputting the resulting blocked picture data, and transform encoding means for transform encoding picture data from the blocking means on the block basis and outputting resulting transform coefficients. The picture compressing device also includes red block detecting means for detecting the block transmitted thereto from the blocking means as being a red block if the block has more than a pre-set number of picture data of red-hued pixels, and quantization means for quantizing transform coefficients from the transform coding means. The picture compressing device additionally includes control means for variably controlling the quantization steps of the quantization means if the block is detected as being a red-hued block by the red block detection means.

With the picture data compressing device according to the present invention, the controlling means variably controls the quantization step of the quantization means so that the quantization step will become finer if the block is detected as being a red-hued block by the red block detection means.

With the picture data compressing device according to the present invention, the controlling means variably controls the quantization step of the quantization means quantizing red data so that the quantization step will become finer for a macro-block consisting of a luminance data block and two color data blocks.

With the picture data compressing device according to the present invention, controlling means performs activity-based classing for a pre-set number of macro-blocks as a processing unit, and adaptively controls the quantization steps of the quantization means according to classes so that such class is selected in which the quantization step of the quantization means quantizing red-hued data is finest if the block from the blocking means is found to be the red-hued block by the red block detection means.

The present invention also provides a red data detecting, device including upper bit extracting means for extracting upper three bits of red-hued data supplied as 8-bit bi-level data and outputting the extracted upper three bits, threshold outputting means for outputting, as threshold data, upper three bits of 8-bit bi-level data that is closest to a reference value employed in detecting red data and that may be divided out by a power of 2, where an exponent is a natural number, and comparator means for comparing red-hued data from the upper bit extracting means with threshold data from the threshold data outputting means. The comparator means outputs high-level red detection data indicating that the picture data is the red data or the low level red detection data indicating that the picture data is not red data when the red data is larger or smaller than the threshold data, respectively.

The present invention also provides a red data detecting device including upper most bit extracting means for extracting upper most bit of blue-hued data supplied as 8-bit bi-level data and outputting the extracted upper most bit, and inverting means for inverting an upper most bit of low level blue-hued data indicating that the picture data is the red data when the upper most bit is supplied from the upper most bit extracting means and outputting the inverted data; as a high level red detection data and for inverting an upper most bit of high level blue-hued data indicating that the picture data is not the red data when the upper most bit is supplied from the upper most bit extracting means and outputting the inverted data as a low level red detection data. The red data detecting device also includes red data detection means for outputting high-level red detection data indicating that picture data is red data only when high-level red detection data is supplied from the comparator means at the same time as high-level red detection data is supplied from the inverting means.

With the red data detection device according to the present invention, threshold data outputting means output upper three bits of bi-level data for 160 which is an 8-bit bi-level data that may be divided by some power of 2, where an exponent is a natural number, as the threshold data, and, if the picture data is red-hued picture data, the blue-hued color data has a value not more than 128 where 1 stands only at the upper most bit of the 8-bit blue color data, the upper most bit extracting means extracts the upper most bit from the 8-bit blue-hued data for outputting low-level blue-hued data indicating that the picture data is the red hued data by extracting the upper most bit from the 8-bit blue-hued data or outputting high level blue-hued data indicating that the picture data is not red picture data.

The present invention also provides a red data detecting device comprising upper bit extracting means for extracting upper three bits of red-hued data supplied as 8-bit bi-level data and outputting the extracted upper three bits, and threshold data outputting means for outputting, as threshold data, upper three bits of 8-bit bi-level data that is closest to a reference value in detecting red data and that may be divided out by a power of 2, where an exponent is a natural number. The red data detecting device also includes comparator means which is adapted for comparing red-hued data from the upper bit extracting means to the threshold data from the threshold data outputting means and for outputting high-level red detection data indicating that the picture data is the red data or the low level red detection data indicating that the picture data is not red data when the red data is larger or smaller than the threshold data, respectively. The red data detecting device additionally includes upper most bit extracting means for extracting the upper most bit of blue-hued data supplied as 8-bit bi-level data and outputting the extracted upper most bit, and inverting means for complementing an upper most bit of low level blue-hued data indicating that the picture data is the red data when the upper most bit is supplied from the upper most bit extracting means and outputting the complemented data as a high level red detection data, and for complementing an upper most bit of high level blue-hued data indicating that the picture data is not the red data when the upper most bit is supplied from the upper most bit extracting means and outputting the inverted data as a low level red detection data. The red data detecting device finally includes red data detection means for outputting high-level red detection data indicating that picture data is red data only when high-level red detection data is supplied from the comparator means at the same time as high-level red detection data is supplied from the inverting means, and a red block discrimination data outputting means having its count value reset for each of pre-set units of picture data and having its count value set to a power of 2, where an exponent is a natural number. The red block decision data outputting means counts the high level red detection data from the red data detection means for each of the pre-set units of picture data and outputs red block decision data indicating that the pre-set unit of picture data is red picture data when the count value of the red detection data reaches the pre-set count value.

With the picture data compressing device according to the present invention, the blocking means divides supplied picture data into plural blocks each consisting of a pre-set number of pixels, and routes the blocked data to transform encoding means and red block detection means. The transform encoding means encode the picture data from the blocking means on the block basis to generate transform coefficients which are routed to the quantization means. The quantization means re-quantize block-based picture data supplied from the transform encoding means. If the red block detecting means detect that the block is the red block, the control means variably controls the quantization step of the R-Y data in the quantization means so that the quantization step in the quantization means will be finer, thereby enabling it to finely re-quantize picture data of the red block.

The red data detection device of the present invention discriminates whether or not the picture data is red picture data based upon the red hued data among the luminance data and two color data, that is red-hued data and blue-hued data, formed from the picture data. The upper bit extraction means extract upper three bits of the red-hued data supplied as 8-bit bi-level data and routes the extracted data to comparator means. That is, the upper bit extraction means extracts fifth to seventh bits from among red-hued data supplied as the 0th to 7th bits, for a total of 8 bits, and routes the extracted bits to the comparator means.

On the other hand, the threshold data outputting means routes to the comparator means threshold data corresponding to upper three bits from among 8-bit bi-level data which is closest to a reference value in detecting red data and which is represented by some power of 2, where an exponent is a natural number.

Specifically, a value in the neighborhood of 170 is desirable as a reference value in detecting red data. The 8-bit bi-level data that may be divided out by some power of 2 and that is closest to 170 is 160 which may be divided out by $2^5$.

160 is represented in 8 bits as "10100000" in which 0s are arrayed next to upper three bits.

The binary data smaller than 160 (0 to 159) is "00000000" to "10011111", with the upper three bits being necessarily smaller than 101. This indicates that red-hued data can be detected only with the upper three bits.

Thus the threshold data outputting means output only the upper three bits, namely "101", of the 8-bit bi-level data "10100000", to the comparator means as the above-mentioned threshold data.

The comparator means compares the red-hued data from the upper bit extracting means with threshold data from the threshold data outputting means. If the red-hued data is larger than the threshold data, the comparator means outputs high-level red detection data indicating that the picture data is red data. Conversely, if the red-hued data is smaller than the threshold data, the comparator means outputs low-level red detection data indicating that the picture data is not red data.

That is, if the upper three bits of the red-hued data is "101" or higher, the picture data is very likely to be red data, so that the comparator means outputs high-level red detection data. Conversely, if the upper three bits of the red-hued data is less than "101", the picture data is hardly likely to be red data, so that the comparator means outputs low-level red detection data.

If the threshold data is 175, it is necessary to compare the threshold data for 175, that is "10100111", with the above-mentioned 8-bit red-hued data, so that 8-bit comparator means is required. However, by setting the threshold data so as to be a value that may be divided out by some power of 2, it becomes possible to discern whether or not the picture data is red based upon comparison of the upper three bits. Thus it becomes possible to discern the color with a number of bits equal to the number of bits of the supplied red-hued data less the exponent. Thus it becomes possible to decrease the number of bits necessary for discrimination, thereby simplifying the hardware and lowering the cost. In addition, since it is possible to detect whether or not the picture data is red picture data, the red detection device may be provided in, for example, a digital VTR in which DCT processing and re-quantization, for example, are carried out on the macro-block basis, so that, if the macro-block is found to be replete with red picture data, the quantization step may be refined for re-quantization, thereby alleviating the so-called block distortion for improving the picture quality.

However, if the picture data is determined to be red data or not based only on the gradation values of red-hued data, some detection error is produced.

Consequently, with the red data detection device according to the present invention, whether or not certain picture data is red picture data is determined based upon blue-hued data as well, and the result of decision with the red-hued data is combined with the result of decision with the blue-hued data in order to determine whether or not the picture data is red picture data.

That is, the red data detection device according to the present invention extracts only the upper most bit of the blue-hued data supplied as 8-bit bi-level data. The reason is that 128, for example, is desirable as a reference value if whether or not the picture data is red data is to be determined with the use of the blue-hued data. 128 may be divided out by $2^7$ and may be represented with 8-bit bi-level data as "10000000". Consequently, in determining whether or not the picture data is red data with the use of the blue-hued data, it suffices if it is determined whether the upper most bit of the blue-hued data is "1" or "0". Thus the upper most bit extracting means extracts and outputs only the upper most bit of the blue-hued data supplied as the 8-bit bi-level data.

If the picture data is red picture data, the blue-hued data has the gradation value of 128 or less. The picture data with blue-hued data having the gradation value in excess of 128 is not red picture data. For this reason, if the picture data is red picture data, the upper most bit extraction means outputs low-level data, whereas, if the picture data is not red picture data, the upper most bit extraction means outputs high-level data.

The inverting means complement data from the upper most bit extracting means, and transmit the complemented data as red detection data to the red detection means. The red detection means outputs high-level red detection data indicating that the picture data is red data only when the high-level red detection data is supplied from the comparator means and simultaneously the high-level red detection data is supplied from the inverting means.

That is, the red data detection means take the picture data as being red picture data when the red-hued data has the gradation value in excess of 160 and the blue-hued data has the gradation value of 128 or less, and outputs the above-mentioned high-level red detection data.

By discriminating whether or not the picture data is red picture data with the use of both the red-hued data and the blue-hued data, red data detection may be achieved more accurately. In addition, by setting the threshold value of the blue-hued data so as to be divisible by some powers of 2, the number of bits required for discrimination can be reduced, for example, it can be reduced to one if the threshold value is 128. Thus, 16 bits required for discrimination with the use of 8 bits each of the red-hued data and the blue-hued data can now be reduced to three bits for the red-hued data and to one bit for the blue-hued data, thus totalling art four bits, thereby simplifying the hardware and lowering the cost.

Next, if processing is to be made on the macro-block basis, as in the case of the above-mentioned digital VTR, it is desirable to control the quantization steps depending on the number of red picture data owned by each macro-block. With this consideration, the red data detection device counts the number of red picture data on the basis of a pre-set processing unit, such as a macro-block, and determines the picture data of such pre-set processing unit to be red picture data when a number of the red picture data in excess of a pre-set value exists in the processing unit.

Thus the red data detection device routes red detection data from red data detection means detecting whether or not the picture data is red picture data to red block discrimination data outputting means based upon the red-hued data and the blue-hued data as described above. The red block discrimination data outputting means is a counter having the capacity of counting up to a certain power of 2, with an exponent being a natural number, for example, a 3-bit counter capable of counting the numbers from 0 to 7. It is reset for each pre-set processing unit, for example, for each macro-block. The red block discrimination data outputting means counts the number of high-level red detection data from the red data detection means. If a number of the high-level red detection data not less than eight is supplied within a time period for one macro-block, the counter outputs red block discrimination data indicating that the macro-block is the red macro-block.

This diminishes the number of counter stages and enables the discrimination of whether or not the picture data is the red picture block to be made on the basis of a pre-set processing unit, such as a macro-block.

Since it is possible with the picture data compressing device of the present invention to re-quantize picture data of red-hued blocks, the picture data of the red-hued blocks may be improved for reproduction. In addition, by re-quantizing the picture data of the red-hued blocks with finer quantization steps on detection of such red-hued blocks, the picture data of the red-hued blocks, otherwise affecting the remaining blocks, that is Y-data and B-Y data blocks, may be improved for reproduction. The result is that block distortion in the reproduced picture of the red-hued picture data may be diminished to contribute to the improved quality of the reproduced picture.

Since the red data detection device of the present invention sets the threshold value for detection of whether or not the picture data is red picture data to a value divisible by powers of 2, as described above, the number of bits necessary for discrimination may be reduced, thus simplifying the hardware and lowering the cost. In addition, since the red detection data used in determining whether or not the picture data is the red picture data is counted using a counter having the capacity of counting up to a pre-set power of 2, the number of the counter stages may be decrease, while red block decision is made on the basis of a pre-set processing unit. Furthermore, it can be detected whether or not the picture data is the red picture data, so that, by providing the red data detection device in a digital VTR executing DCT processing or re-quantization on the basis of a pre-set processing unit, and by refining the quantization steps for re-quantization if it is found that the picture of the preset processing unit contains a pre-set larger quantity of red picture data, it becomes possible to alleviate the block distortion to contribute to the improved picture quality.

BRIEF DESCRIPTION OF THE DRAWINGS

FIG. 9 is a diagrammatic view showing the classing information outputted by an activity detector in the picture data compressing device shown in FIG. 8.

FIG. 10 is a diagrammatic view showing the classing information outputted by a classing circuit in the picture data compressing device shown in FIG. 8.

FIGS. 11a and 11b are diagrammatic views showing region numbers for weighting the picture information processed with DCT by a DCT circuit in the picture data compressing device shown in FIG. 8.

FIG. 12 is a diagrammatic view showing the weight for each region of the DCT block and the quantization number (Q-number) specified by a data quantity calculator in the picture data compressing device shown in FIG. 8.

DESCRIPTION OF THE PREFERRED EMBODIMENTS

Figure 1:
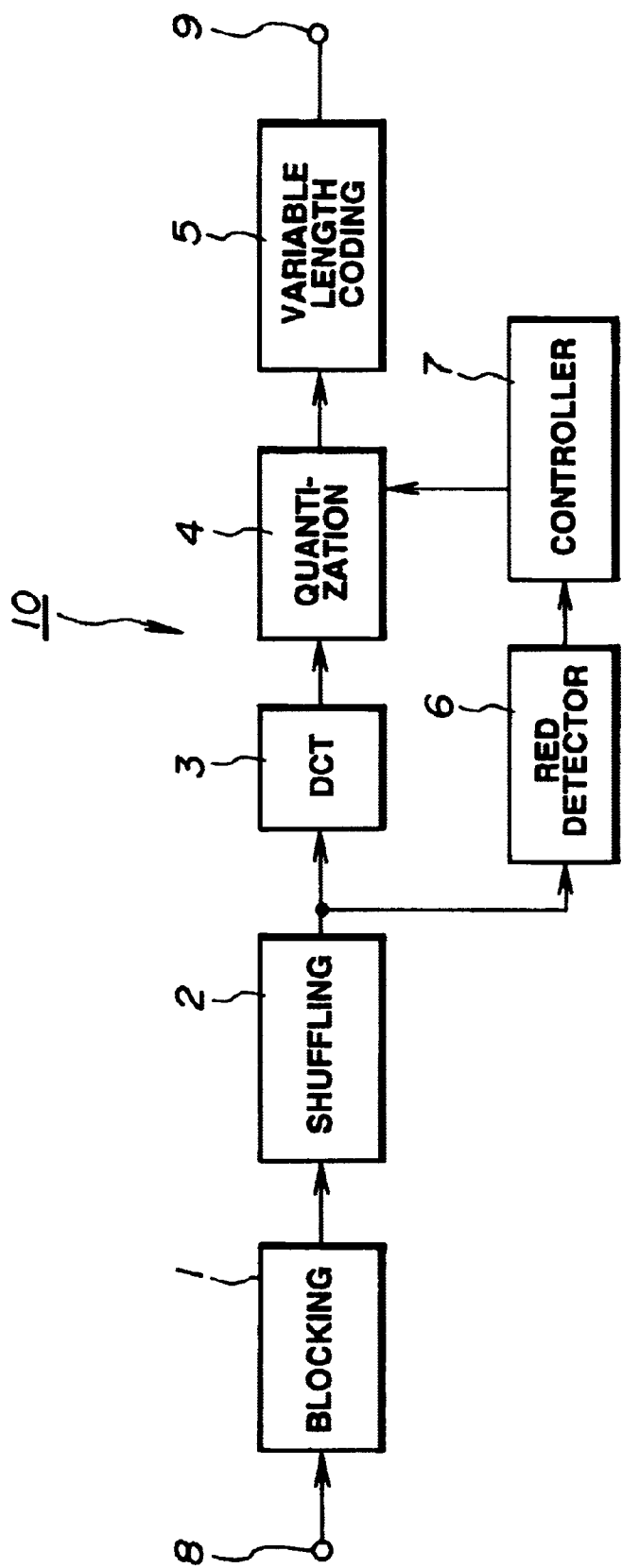
FIG. 1 is a schematic block diagram showing an arrangement of a picture data compressing apparatus according to the present invention.

Referring to the drawings, preferred embodiments of the picture data compressing device and the red-hued data detection device according to the present invention will be explained in detail.

The picture data compressing device according to the present invention includes a blocking circuit 1, as blocking means for dividing picture data into blocks each consisting of a pre-set number of pixels, and a shuffling circuit 2 for shuffling the picture data blocked by the blocking circuit 1, as shown for example in FIG. 1. The picture data compressing device also includes a discrete cosine transform (DCT) circuit 3 as transform encoding means for orthogonally transforming the shuffled picture data for conversion into data in the frequency domain and outputting the resulting transform coefficients, a quantization circuit 4 as quantization means for re-quantizing the transform coefficients, and a variable length encoding circuit 5 for providing a fixed data word length for picture data from the quantization circuit 4. Furthermore, the picture data compressing device includes a red hue detector 6 for detecting a block of picture data supplied from the shuffling circuit 2 as being a red-hued block when it has a number of red-hued pixels in excess of a pre-set number, and a controller 7 as controlling means for refining the quantization steps of the quantization circuit 4 when the block has been detected as being a red-hued block by the red-hue detector 6.

The red-hue detector 6 according to the present invention detects whether or not a given macro-block is a red-hued macro-block, from one macro-block to another, based on the R-Y data and the B-Y data among the luminance data (Y data), red color data (R-Y data) and the blue color data (B-Y data), produced from the three color picture data. The red-hued detector is constructed for example as shown in FIG. 2.

Figure 2:
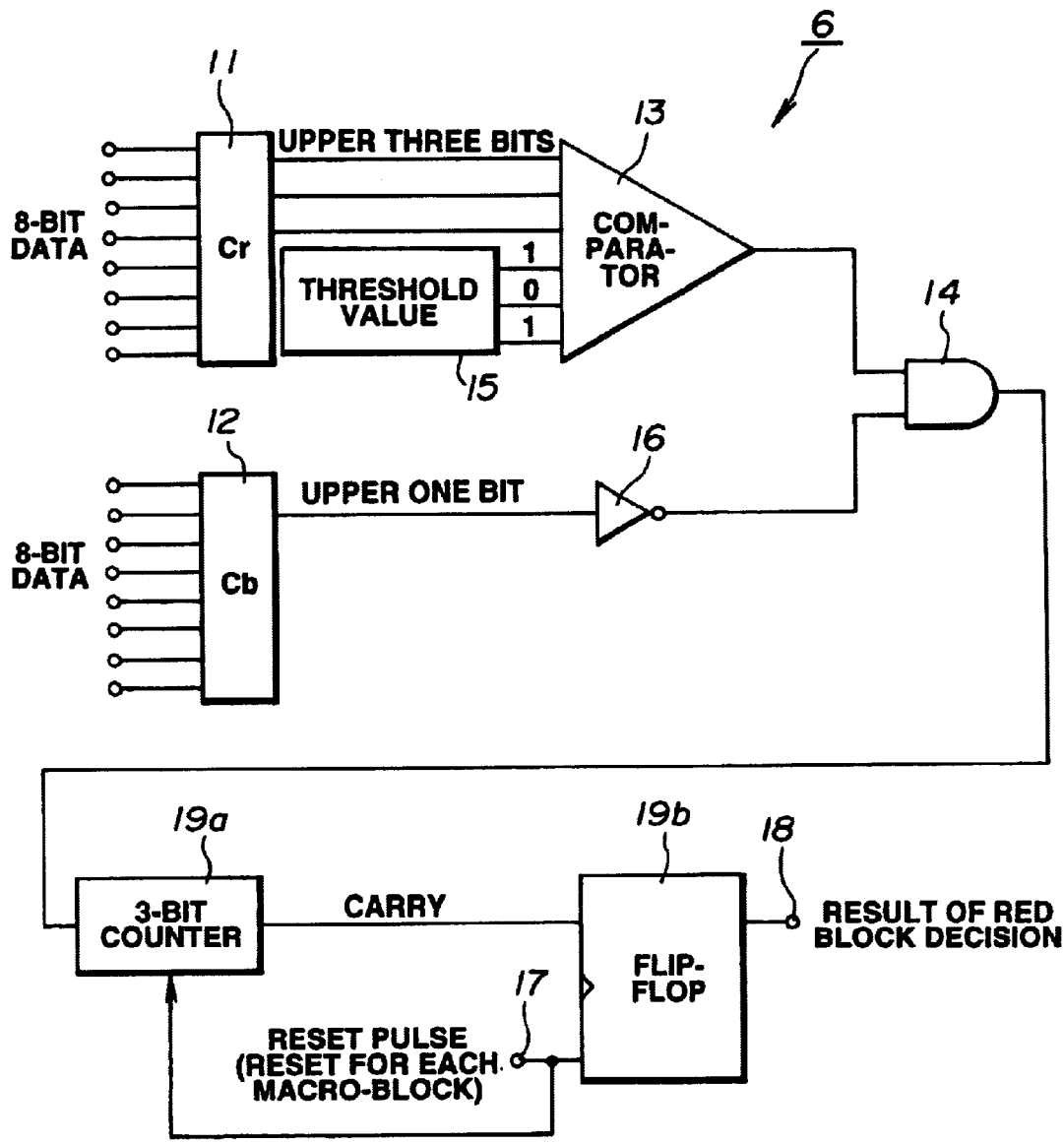
FIG. 2 is a block diagram showing an arrangement of a red data detection device according to the present invention.

The red-hue detector 6 has a red data extraction circuit 11 for extracting and outputting upper three bits from the R-Y data supplied as 8-bit bi-level data and a blue data extraction circuit 12 for extracting and outputting only the upper most bit from the B-Y data supplied as 8-bit bi-level data, as shown in FIG. 2. The red detector 6 includes a threshold value data outputting circuit 15 for extracting upper three bits of the 8-bit bi-level data which may be divided out by a power of 2 and which is closest to a number employed as a reference value in detecting the red data, where the exponent is a natural number, and a comparator 13 for comparing the threshold value data with the R-Y data from the red data extraction circuit 11. The red detector 16 also includes an inverter for complementing the upper most bit of the B-Y data from the blue data extraction circuit 12, and an AND gate 14 for outputting a high-level red detection data when the comparison output of the comparator 13 and the output of the inverter 16 are both at a high level. Furthermore, the red detector 6 includes a 3-bit counter 19a for counting the high-level red detection data from the AND gate 14 from 0 to 7, and a flip-flop 19b which is reset on the macro-block basis and which outputs a red block decision data indicating that the current macro-block is a red macro-block when there is a carry outputted by the 3-bit counter 9a having counted 8 high-level red detection data.

Figure 3:
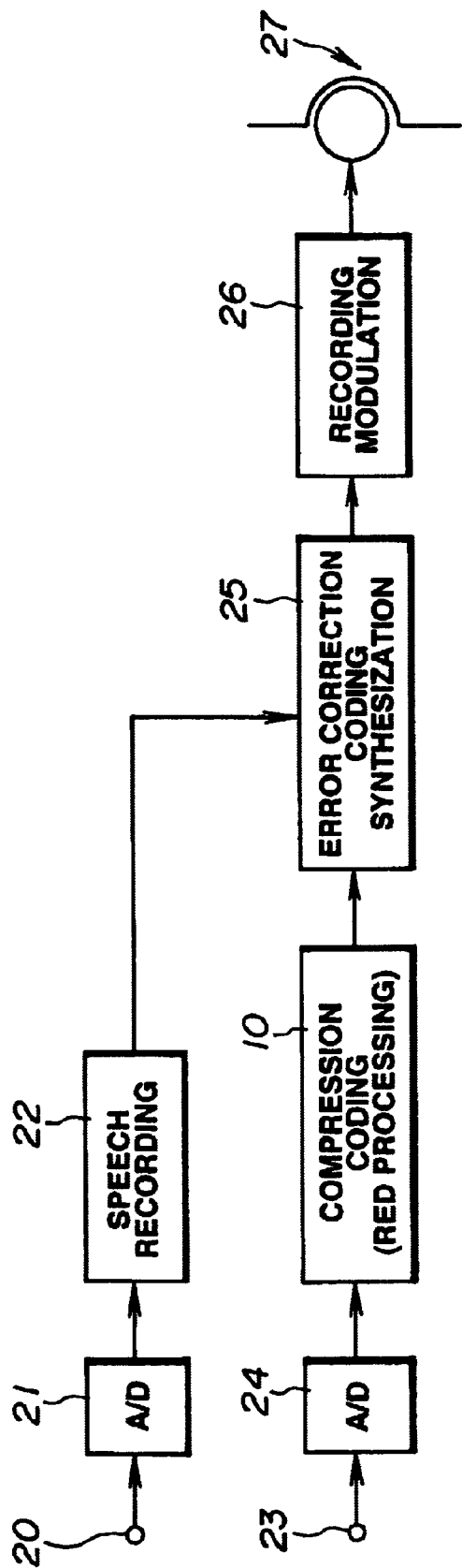
FIG. 3 is a block diagram showing an arrangement of a digital VTR employing the picture data compressing device shown in FIGS. 1 and 2.

The above-described picture data compressing device according to the present invention is employed as a compression encoding circuit 10 in the recording system of the digital VTR as shown for example in FIG. 3.

The operation of the picture data compressing device according to the present invention, that is the compression coding circuit 10, inclusive of the operation of the digital VTR, is hereinafter explained.

Referring first to FIG. 3, an analog audio signal is supplied via an input terminal 20 to an A/D converter 21, while an analog picture signal is supplied via an input terminal 23 to an A/D converter 24.

The A/D converter 21 formulates audio data by digitizing the audio signals to transmit the audio data to an audio recording processing circuit 22. The audio recording processing circuit 22 modifies the audio data into a form suitable for recording and routes the modified data to an error correction coding combining circuit 25.

The A/D converter 24 digitizes the picture signals by sampling using sampling clocks having a pre-set frequency to generate component data, that is luminance data (Y data) and two color difference data (R-Y data and B-Y data), and transmits the component data to the compression coding circuit 10 which is the picture data compressing device according to the present invention.

The above-mentioned component data is supplied to blocking circuit 1 via input terminal 8 of the compression coding circuit 10 shown in FIG. 1.

Figure 4:
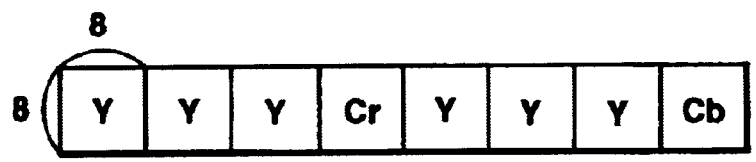
FIG. 4 is a diagrammatic view showing a data array of a macro-block as a picture data processing unit in the digital VTR shown in FIG. 3.
Figure 5A:
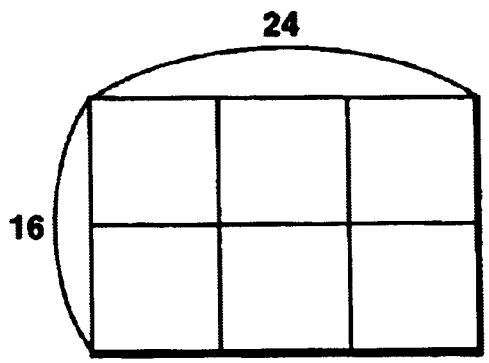
FIGS. 5a, 5b and 5c are diagrammatic views showing luminance data and two color difference data making up the macro-block.
Figure 5B:
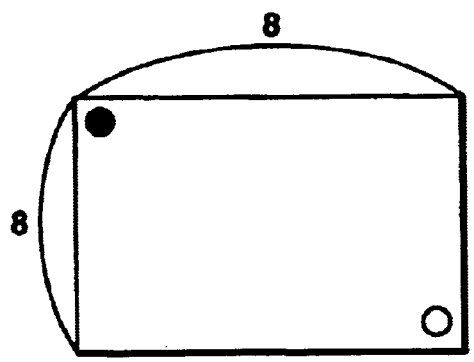
Figure 5C:
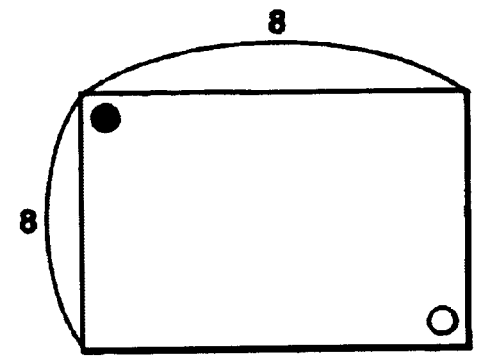

The blocking circuit 1 generates DCT blocks each consisting of 64 pixels, arranged in a matrix of 8 vertically arrayed pixels and 8 horizontally arrayed pixels, from the Y-data, R-Y data and the B-Y data of the same region, as shown for example in FIG. 4. From the eight DCT blocks, that is six DCT blocks of the Y-data, shown in FIG. 5a, one DCT block of the R-Y data, shown in FIG. 5b and one DCT block of the B-Y data, shown in FIG. 5c, one macro-block is formed and outputted. The eight DCT blocks making up such macro-block should be data located in the same screen region. The picture data of the macro-block is supplied to the shuffling circuit 2.

The shuffling circuit 2 shuffles data on the macro-block basis in a predetermined manner and outputs five of the shuffled macro-blocks as a unit. The picture data outputted on the unit basis are supplied to the DCT circuit 3 and the red detector 6. The picture data outputted on the unit basis is supplied to the DCT circuit 3 and to the red detector 6. The DCT circuit 3 transforms the picture data (Y data, R-Y data and B-Y data) of each DCT block of each of the five macro-blocks making up each unit into data in the frequency domain and routes the transform coefficients to the quantization circuit 4. The quantization circuit 4 re-quantizes the transform coefficients of the Y data, R-Y data and B-Y data for compressing the picture data and outputting the compressed picture data.

The red detector 6 has a construction as shown in FIG. 2, in which the R-Y data is supplied to a red data extraction circuit 11 and the B-Y data is supplied to a blue data extraction circuit 12.

Figure 6:
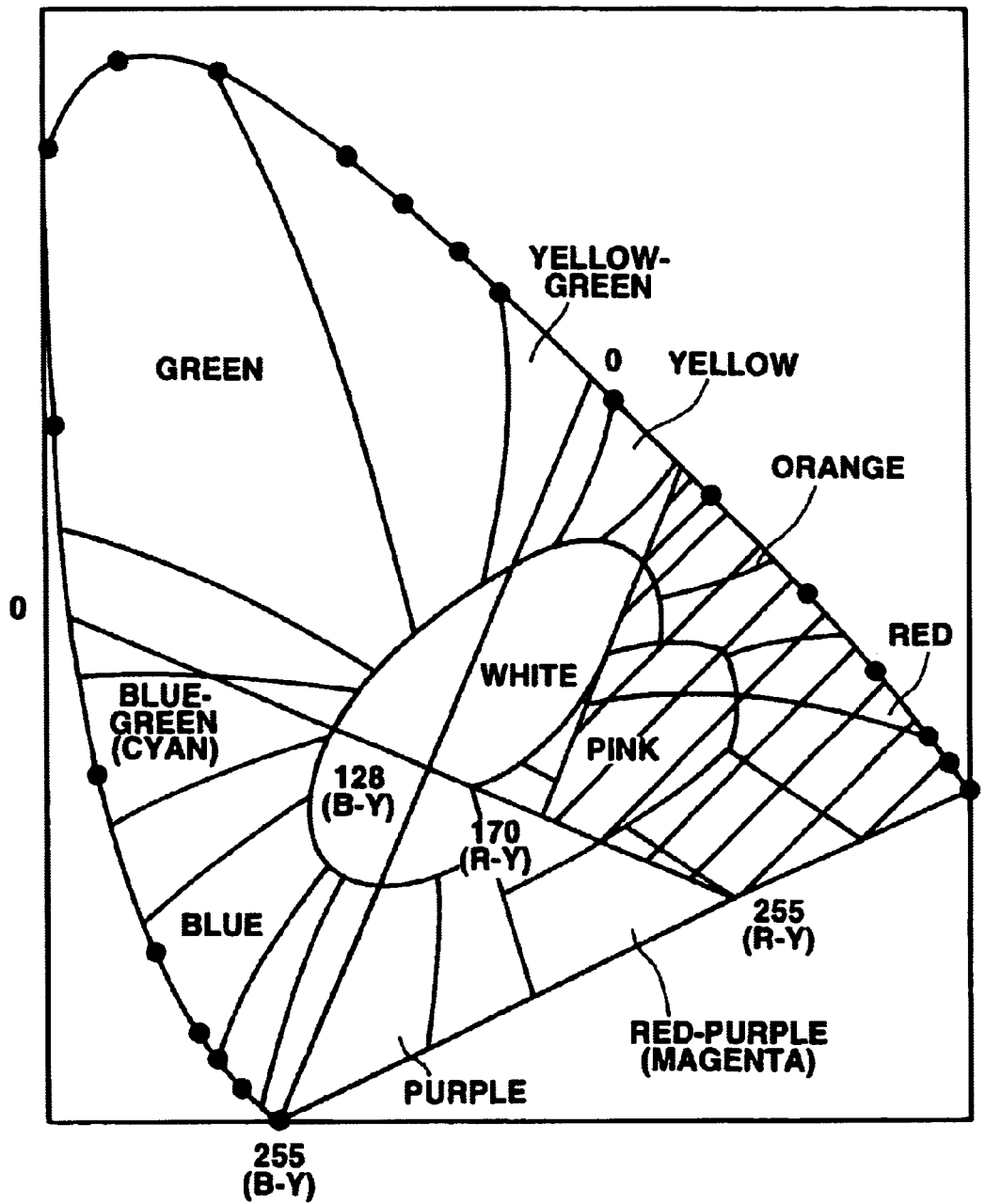
FIG. 6 is the CIE chromaticity diagram for explaining the red-hued block detecting operation of a red-hue detector provided in the picture data compressing device.

In the chromaticity diagram promulgated by Comite Internationale del'Eclairagel, as shown in FIG. 6, a straight line drawn from a point of approximately 0.02 on the X-axis and approximately 0.44 on the Y-axis to a point of approximately 0.6 on the X-axis and approximately 0.2 on the Y-axis represents an axis of the R-Y data. On the other hand, a straight line drawn from a point of approximately 0.42 on the X-axis and approximately 0.56 on the Y-axis to a point of approximately 0.16 on the X-axis and 0 on the Y-axis represents an axis of the B-Y data.

It is now supposed that the axis of the R-Y data is divided into 256 gradations, that is 0th to 255th gradation, where a point indicated by approximately 0.02 on the X-axis and approximately 0.44 on the Y-axis is the 0th gradation and a point indicated by approximately 0.6 on the X-axis and approximately 0.2 on the Y-axis is the 255th gradation, and that the axis of the B-Y data is divided into 256 gradations, that is 0th to 255th gradient, where a point indicated by approximately 0.42 on the X-axis and approximately 0.56 on the. Y-axis is the 0th gradation and a point indicated by approximately 0.16 on the X-axis and 0 on the Y-axis is the 255th gradation. In such case, picture data encompassed by higher than 170th gradient on the axis of the R-Y data and not more than 128th gradation on the axis of the B-Y data represents picture data of substantially red-hued pixels.

If one-unit picture data is supplied to the red detector 6 from the shuffling circuit 2, the red detector 6 detects R-Y data of the pixels of not lower than the 170th gradation from among the R-Y data of 64 pixels making up each DCT block and transmits the detected output to the controller 7, while also detecting B-Y data of the pixels of not higher than the 128th gradation from among the B-Y data of the 64 pixels making up each DCT block and transmits the detected output to the controller 7.

It is noted that the 8-bit bi-level data which can be divided out by a power of 2 and which becomes closest to 170 (a reference value to be used in detecting red data with the R-Y data) is 160, that is 160 can be divided out by $2^5$. If represented with 8 bits, 160 is "10100000", in which "0" appears at each of the bits lower than the upper three bits. If represented by bi-level data, 0 to 159 (numbers smaller than 160) is "00000000" to "10011111", that is, the values of upper three bits necessarily become 101 or larger. This indicates that red data can be detected from the upper three bits of the 8-bit R-Y data.

Thus the red data extraction circuit 11 of the red detector 6 extracts the upper three bits, namely the fifth to seventh bits, from among the 8-bit R-Y data, namely 0th to 7th bits, and routes these upper three bits to the comparator 13.

On the other hand, the threshold data outputting circuit 15 routes the upper three bits "101" of the 8-bit bi-level data "10100000", which is equal to 160, to the comparator 13, as threshold data.

The comparator 13 compares the 3-bit R-Y data from the red data extraction circuit 11 to the 3-bit threshold data from the threshold data outputting circuit 15. If the R-Y data is larger than the threshold data, the comparator 13 outputs high level red detection data indicating that the picture data is red data to an AND gate 14. Conversely, if the R-Y data is lesser than the threshold data, the comparator 13 outputs low level red detection data, indicating that the picture data, is not red data to the AND gate 14.

That is, if the upper three bits of the R-Y data is not less than "101", the picture data is very likely to be red in hue, so that the comparator 13 outputs high-level red detection data to the AND gate 14. Conversely, if the upper three bits of the R-Y data is less than "101", the picture data is not likely to be red in hue, so that the comparator 13 outputs low-level red detection data to the AND gate 14.

It is noted that the 8-bit bi-level data which can be divided out by a power of 2 and which becomes closest to 128 (a reference value to be used in detecting red data with the B-Y data) is 128, that is 128 can be divided out by $2^7$. If represented with 8 bits, 128 is "10000000", in which "0" appears at each of the bits lower than the upper most bit. This indicates that red data can be detected only from the upper most one bit.

Thus the blue data extracting circuit 12 extracts only the upper most bit from the B-Y data supplied as the 8-bit bi-level data, and transmits the extracted upper most bit to the inverter 16.

When the picture data is the red picture data, the B-Y data has the gradation lower than 128. That is, the picture data having the B-Y data having the gradation not lower than 128 is not red data. Consequently, if the picture data is the red picture data, the blue data extraction circuit 12 outputs a low-level data and, if otherwise, the blue data extraction circuit 12 outputs a high-level data.

The inverter complements the upper most bit of the B-Y data from the blue data extraction circuit 12 and routes the complemented data as red detection data to the AND gate 14.

The AND gate 14 outputs high-level red detection data indicating that the picture data is red only when the high-level red detection data is supplied from the comparator 13 and the high-level red detection data is supplied from the inverter 16.

That is, the AND gate 14 takes the picture data as being red data when the R-Y data has the gradation in excess of 160 and the B-Y data has the gradation of not more than 128, and outputs the high-level red detection data. The red detection data is supplied to the 3-bit counter 19*a*.

If the threshold data has the gradation of 175, it would be necessary to compare the threshold data "10100111" for 175 with the 8-bit R-Y data, so that an 8-bit comparator would be required. However, by using the threshold data that can be divided out by some power of 2, whether or not the picture data is red data can be determined based upon the comparison of the upper three bits. That is, it becomes possible to make a decision with the number of bits equal to the number of bits of the supplied R-Y data less the exponent. On the other hand, by setting the threshold value of the B-Y data to 128 which can be divided out by some power of 2, the number of bits required for such decision may be reduced to one.

It is thus seen that, while 16 bits were required for the above decision with the use of 8 bits each for the R-Y data and the B-Y data, it is only necessary with the present red detector 6 to use four bits, that is 3 bits for the R-Y data and one bit for the B-Y data.

Thus it becomes possible to reduce the number of bits necessary for the above decision, thus simplifying the hardware for reducing the cost.

The 3-bit counter 19*a* is reset with the reset pulse supplied from the input terminal 7 on the macro-block basis, thus counting the number of high-level red detection data supplied from the AND gate 14 from 0 to 7. When the counted number of the high-level red detection data is equal to 7, the counter 19*a* routes a carry to the flip-flop 19*b*.

Similarly to the 3-bit counter 19*a*, the flip-flop 19*b* is reset on the macro-block basis with a reset pulse supplied from the input terminal 17. Thus the flip-flop 19*b* outputs a high-level red block decision data indicating that the macro-block is the red macro-block when the carry is supplied thereto since then eight or more red picture data exist in the macro-block. However, the flip-flop 19*b* outputs a low-level red block decision data indicating that the macro-block is not the red macro-block when the carry is not supplied thereto since then there are not eight or more red picture data present in the macro-block. The red block decision data is routed via an output terminal 18 to the controller 7 shown in FIG. 1.

By providing the counter for the power of 2, where the exponent is a natural number, it becomes possible to reduce the number of stages of the counter. Besides, by giving a decision that the macro-block is the red macro-block when a pre-set counter value is reached, the decision on whether or not the data is red picture data can be given on the macro-block basis.

When fed with the high-level red block decision data indicating that the macro-block is the red macro-block, the controller 7 routes control data indicating that the macro-block is the red macro-block to the quantization circuit 4. The controller 7 detects the levels of the Y-data, R-Y data and B-Y data in order to determine the quantization steps of these data in the quantization circuit 4, and routes control data for controlling the quantization steps to the quantization circuit 4. If 20 or more of the 64 pixels have the level equal to the 170th gradation or more on the axis of the R-Y data and the level equal to the 128th gradation or less on the axis of the B-Y data, the controller determines the block to be a red-hued DCT block, and routes control data indicating that the block is the red-hued block to the quantization circuit 4.

Figure 7:
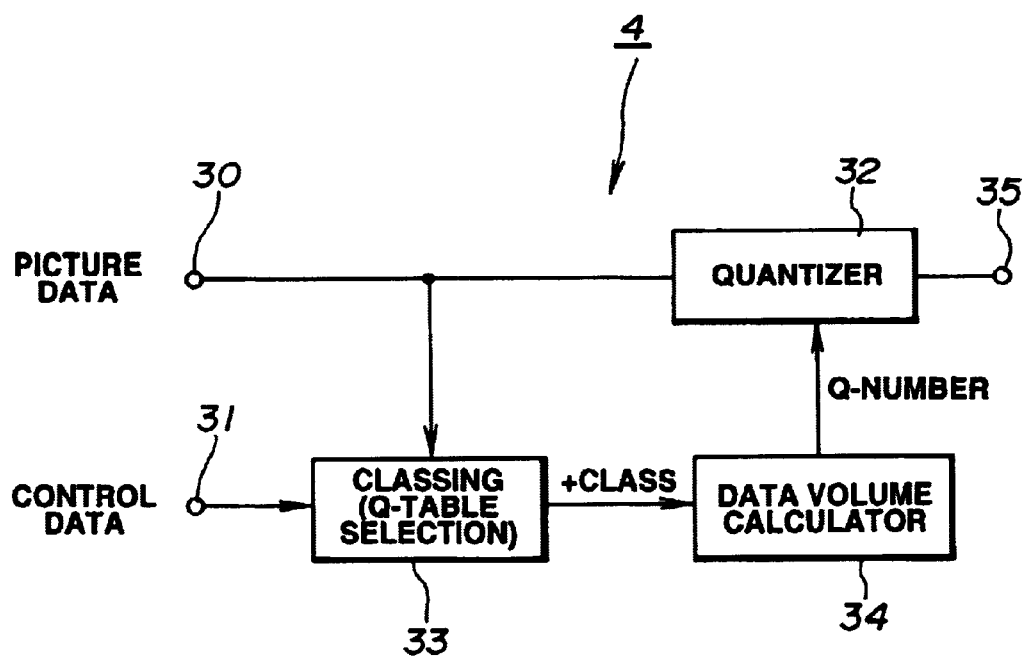
FIG. 7 is a block diagram of a quantization circuit provided in the picture compressing device.

The quantization circuit 4 is configured as shown in FIG. 7, in which the above-mentioned picture data is transmitted via an input terminal 30 to a quantizer 32, while the above-mentioned control data is supplied via an input terminal 31 to a classing circuit 33.

The classing circuit 33 selects, based upon the above-mentioned control data, a quantization table for quantizing the Y-data, R-Y data and the B-Y data, from among four quantization tables (Q-tables), having the quantization steps which become progressively coarser, and routes a corresponding selection data to a data quantity calculator 34. If fed with the control data indicating that the block is the red-hued DCT block, the classing circuit selects that quantization table having a quantization step finer by one stage for the DCT block of the R-Y data, and routes the corresponding selection data to the data quantity calculator 34.

In order for fixed length picture data to be outputted on the unit basis by the variable length encoding circuit 5 as later explained, the data quantity calculator 34 calculates an optimum one of quantization numbers in the quantization tables as indicated by the above-mentioned selection data, and routes the quantization coefficients to the quantizer 32. If the block is found to be the red-hued DCT block, the data quantity calculator 34 calculates one of quantization numbers in the quantization tables of the finer stage, which is optimum for finer re-quantization of the R-Y data. The calculator 34 also calculates such quantization coefficient which, by quantizing the Y data and the B-Y data more roughly substantially in inverse proportion to the refined quantization step for the R-Y data, will give a fixed data length of the one-unit picture data outputted from the variable length coding circuit 5. These quantization coefficients are routed to the quantizer 32.

The quantizer 32 re-quantizes the Y-data, R-Y data and the B-Y data, based upon the quantization coefficients for respective data supplied from the data quantity calculator 34, for compressing picture data. The compressed data is supplied via an output terminal 35 to the variable length encoding circuit 5. shown in FIG. 1.

With the above-described picture compression device of the present invention, if a given DCT block is found to be a red-hued DCT block, the quantizer 32 causes the R-Y data to be quantized at a finer quantization step. This is effective in improving reproduction of the R-Y data in the reproduced picture and alleviating block distortion thereby improving the quality of the reproduced picture.

The variable length encoding circuit 5 fixes the data quantity of the component data generated from the Y-data, R-Y data and the B-Y data so that the data length per unit will be constant, and routes the resulting fixed length data via an output terminal 9 to an error correction coding combining circuit 25, shown in FIG. 3. The error correction coding combining circuit 25 combines the component data having the fixed length on the unit basis with audio data from the audio recording processing circuit 22 to generate recording data. To this recording data is appended parity data for error correction and the resulting data is supplied to a recording modulating circuit 26. The recording modulating circuit 26 modulates the picture data generated by the combining operation in a pre-set manner and routes the modulated picture data to the recording head 27. This results in bias recording of the picture data on the video tape by the recording head 27.

Figure 8:
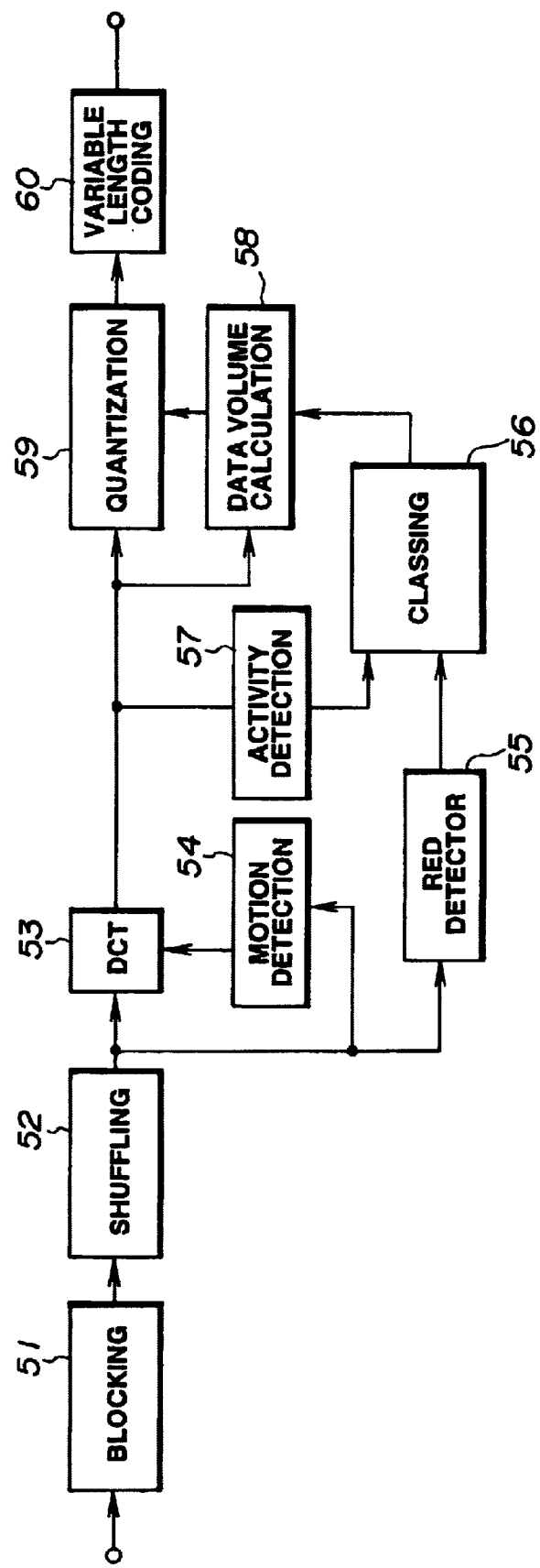
FIG. 8 is a block diagram showing a modification of the picture data compressing device according to the present invention.
Figure 13:
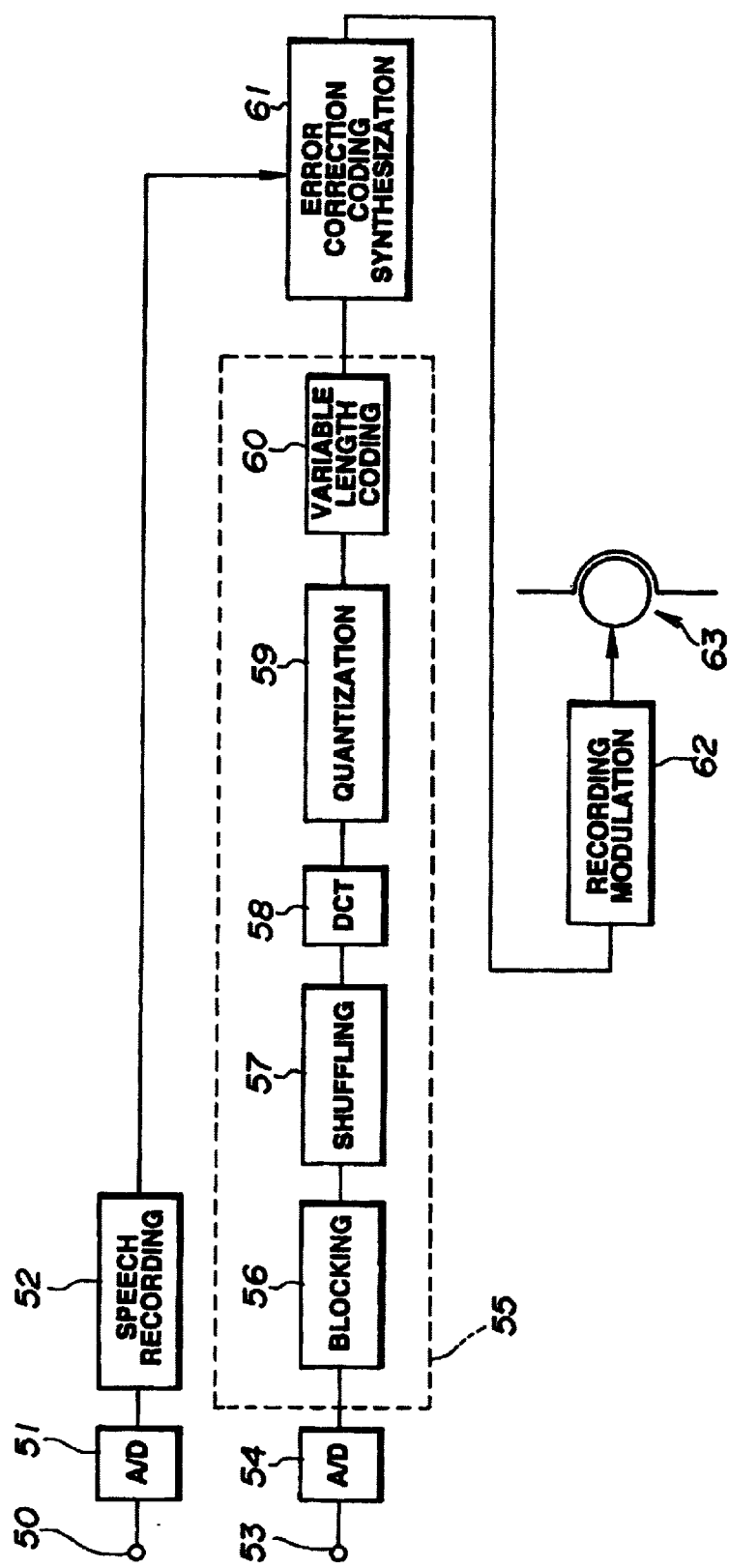
FIG. 13 is a block diagram showing a conventional digital VTR.

The picture compression device according to the present invention may be configured as shown for example in FIG. 8. The picture compression device shown in FIG. 8 is improved over the picture compressing device shown in FIG. 1 and comprises a shuffling circuit 52 for shuffling macro-block based picture data generated by the blocking circuit 51, a DCT circuit 53 fed with shuffled data from the shuffling circuit 52, a motion detector 54 and a red detector 55.

The blocking circuit 51 processes the input picture data by generating DCT blocks, each consisting of 64 pixels arranged in a matrix of 8 vertically arrayed pixels by 8 horizontally arrayed pixels, from the luminance data Y, R-Y data $P_R$ and B-Y data $P_B$ in the same picture location. Thus the blocking circuit 51 generates one macro-block from six Y-data DCT blocks, one R-Y data DCT block and one B-Y data DCT block, and outputs the formed macro-block. The shuffling circuit 52 shuffles the picture data supplied from the blocking circuit 51 on the macro-block basis in a pre-set manner and outputs five shuffled macro-blocks as a lump (unit).

The DCT circuit 53 processes picture data devoid of motion with discrete cosine transform (DCT), with the 8×8 pixel DCT block as a processing unit, based upon the results of detection by the motion detection unit 54, while processing the moving picture data with discrete cosine transform of sum data or difference data between fields, with the 2×8×4 pixel DCT block as a processing unit, based upon the results of detection by the motion detection unit 54.

The red detector 55 counts the number of pixels of picture data of the DCT block, consisting of 8×8=64 pixels, which are comprised in a range of not less than 160th gradation on the axis of the R-Y data $P_R$ and of less than 128th gradation on the axis of the B-Y data $P_B$, and detects the DCT block having the count value of 11 or more as a red block.

The picture compression device also comprises a classing circuit 56 fed with a detection output of the red detector 55, an activity detector 57 fed with an output of the DCT circuit 53, a data quantity detector 58 and a quantization circuit 59.

The activity detector 57 detects the maximum value of the AC coefficient of the DCT transform coefficients of picture data, supplied as an output of the DCT circuit 53 as the information indicating the picture activity, and transmits the classing information data 0 to 3 to the data quantity detector 58, responsive to the maximum value, as shown for example in FIG. 3.

The classing circuit 56 transmits, based upon the classing information data 0 to 3 from the activity detector 57 and a detection output of the red detector 55, the classing information data 0 to 3 shown in FIG. 10 to the data quantity detector 58.

That is, the classing circuit 56 is responsive to the classing information data 0 to 3 from the activity detector 57 to supply to the data quantity detector 58 the first to fourth classing information data 0 to 3 having the progressively rough degree of quantization for the luminance data Y, R-Y data $P_R$ and B-Y data $P_B$, Besides, the classing circuit 56 transmits to the data quantity detector 58 the classing information 0 designating the finest quantization for quantizing the DCT block of the R-Y data $P_R$ of the red-hued DCT block designated by the detection output of the red detector 55.

The data quantity detector 58 calculates, based upon the classing information data 0 to 3 supplied from the classing circuit 56, the optimum quantization coefficient for each of the luminance data Y, R-Y data $P_R$ and B-Y data $P_B$ from among the quantization coefficients (Q-Nos) in the quantization tables, in order for fixed length picture data to be supplied on the unit basis from the variable length coding circuit 60 fed with an output of the quantization circuit 59. These quantization coefficients are supplied to the quantization circuit 59.

The 8×8 pixel DCT block for the picture data devoid of the motion, DCTed by the DCT circuit 53, and the 2×8×4 pixel DCT block for the moving picture data, similarly DCTed by the DCT circuit 53, are each divided into eight areas indicated by area numbers 0 to 7 in terms of the AC coefficients. The data quantity detector 58 designates the quantization coefficients (Q-Nos) 0 to 15 for each of the classing information data 0 to 3 and specifies weights 1 to 32 for the eight areas, as shown in FIG. 12. The weights 1 to 32 for the areas indicate the divisors for the input picture data. For example, the weight 2 indicates that quantization is to be made with weighting equal to ½ for the input picture data.

By re-quantizing only R-Y data $P_R$ with finer steps on detecting red-hued blocks, as in the picture compressing device of the present embodiment, it becomes possible to improve reproduction of the picture data of the red blocks affecting remaining blocks of the luminance data Y or the B-Y data $P_B$.

Although the DCT circuit 3 is employed as transform coding means in the above-described embodiments, it may be replaced by other transform coding means, such as an Hadamard transform circuit, discrete sine transform circuit, K-L transform circuit or a slant transform circuit. On the other hand, the DCT block formed by 8×8=64 pixel data and the R-Y data represented by 256 gradations, expressed with 8 bits, are given only by way of illustration and hence may be modified within the scope of the present invention.

What is claimed is:

1. A red data detection device, comprising:
   upper bit extracting means for extracting only upper three bits of red-hued data supplied as 8-bit bi-level data and outputting the extracted upper three bits;
   threshold data outputting means for outputting, as threshold data, the upper three bits of 8-bit bi-level data which is near a reference value that is employed in detecting red data, said threshold data being less than and never equal to said reference value and being divisible by a power of 2, where an exponent is an integer; and comparator means for comparing red-hued data from the upper bit extracting means with the threshold data from said threshold data outputting means, said comparator means selectively outputting high-level red detection data indicating that the picture data is the red data when the red data is larger than the threshold data or outputting low-level red detection data indicating that the picture data is not red data when the red data is smaller than the threshold data.

2. The red data detection device as claimed in claim 1, further comprising upper most bit extracting means for extracting an upper most bit of blue-hued data supplied as 8-bit bi-level data and outputting the extracted upper most bit, inverting means for inverting said upper most bit of low level blue-hued data indicating that the picture data is the red data when said upper most bit is supplied from said upper most bit extracting means and outputting the inverted data as a high level red detection data, and for inverting said upper most bit of high-level blue-hued data indicating that the picture data is not the red data when said upper most bit is supplied from said upper most bit extracting means and outputting the inverted data as a low-level red detection data, and red data detection means for outputting high-level red detection data indicating that the picture data is red data when only high-level red detection data is supplied from said comparator means at the same time as high-level red detection data is supplied from said inverting means.

3. The red data detection device as claimed in claim 2, wherein said threshold data outputting means outputs the upper three bits of bi-level data for the decimal 160, which is an 8-bit bi-level data that may be divided by said power of 2 where an exponent is a natural number, as said threshold data, and wherein if said picture data is red-hued picture data, the blue-hued data has a value not more than the decimal 128 where binary 1 stands only at the upper most bit of the 8-bit blue-hued data, said upper most bit extracting means extracting the upper most bit from the 8-bit blue-hued data for outputting low-level blue-hued data indicating that the picture data is the red hued data, or outputting high-level blue-hued data indicating that the picture data is not red picture data.

4. A red data detection device, comprising:

upper bit extracting means for extracting only upper three bits of red-hued data supplied as 8-bit bi-level data and outputting the extracted upper three bits;

threshold data outputting means for outputting, as threshold data, the upper three bits of 8-bit bi-level data that is near a reference value used in detecting red data and that may be divided out by a power of 2, where an exponent is an integer, said threshold data being than less and never equal to said reference value;

comparator means for comparing the red-hued data with the threshold data, said comparator means selectively outputting high-level red detection data indicating that the picture data is the red data when the red data is larger than the threshold data or outputting the low-level red detection data indicating that the picture data is not red data when the red data is smaller than the threshold data;

upper most bit extracting means for extracting an upper most bit of blue-hued data supplied as 8-bit bi-level data and outputting the extracted upper most bit;

inverting means for complementing the upper most bit of low-level blue-hued data indicating that the picture data is the red data when said upper most bit is supplied from said upper most bit extracting means and outputting the inverted data as a high-level red detection data, and for complementing an upper most bit of high-level blue-hued data indicating that the picture data is not the red data when said upper most bit is supplied from said upper most bit extracting means and outputting the inverted data as a low-level red detection data;

red data detection means for outputting high-level red detection data indicating that the picture data is red data when only high-level red detection data is supplied from said comparator means at the same time as high-level red detection data is supplied from said inverting means; and a red block decision data outputting means having its count value reset for each of pre-set units of picture data and having its count value set to a power of 2, where an exponent is a natural number, said red block decision data outputting means counting the high-level red detection data from the red data detection means for each of the pre-set units of the picture data and outputting red block decision data indicating that the pre-set unit of the picture data is red picture data when the count value of the red detection data reaches the pre-set count value.

5. A picture compression device, comprising:

a blocking circuit for dividing picture data into a plurality of blocks, each block having a predetermined number of pixels, and for outputting the block-based picture data;

a transform coding circuit for coding the block-based picture data on a block-by-block basis and for generating transform coefficients defining the picture data as a result of the coding;

a red hue detector for determining whether a block received from said blocking circuit is a red-hued block, said red hue detector comprising (a) a red data extraction circuit for extracting a predetermined number of bits from 8-bit data representing the picture data, (b) a threshold data outputting circuit for supplying the same said predetermined number of bits derived from an 8-bit threshold value, and (c) a comparator for comparing said predetermined number of bits of said 8-bit data to said predetermined number of bits of said 8-bit threshold value to determine whether said block has more than a predetermined number of red-hued pixels in the picture data, said 8-bit threshold value being the closest to a reference value that is used in detecting red data and being less than and never equal to said reference value such that said 8-bit threshold value is divisible by $2^n$ where n is an integer;

a quantization circuit for quantizing the transform coefficients; and a controller for controlling a quantization step of said quantization circuit if said block is detected as a red-hued block.

6. The device according to claim 5, wherein said controller performs activity-based classing for a pre-set number of macro-blocks as a processing unit, said controller adaptively controlling the quantization steps of said quantization circuit according to classes such that a class is selected in which the quantization step of said quantization circuit quantizing red-hued data is smaller if said block from said blocking circuit is found to be said red-hued block.

7. The device according to claim 5, wherein said controller decreases said quantization step, thereby producing finer quantization, if said block is detected as a red-hued block.

8. The device according to claim 7, wherein said block includes luminance data and color data.

9. The device according to claim 5, further comprising a shuffling circuit connected at one end to said blocking circuit and at another end to said transform coding circuit and red hue detector, for shuffling the block-based picture data received from said blocking circuit.

* * * * *